Patented July 10, 1951

2,560,035

UNITED STATES PATENT OFFICE 2,560,035

THIO-2-FURAMIDES

Glen Alliger, Boston Heights, Ohio, assignor to The Firestone Tire & Rubber Company, Akron, Ohio, a corporation of Ohio No Drawing. Application December 30, 1948, Serial No. 68,429

8 Claims. (Cl. 260—345)

This invention relates to the thio-2-furamides and particularly the aliphatic thio-2-furamides. These compounds are of interest as rubber chemicals and as intermediates for the manufacture of rubber chemicals.

The thiofuramides may be prepared by condensation of an aliphatic-type N-haloamine with a soluble salt of 2-dithiofuroic acid. By using different amines, different furamides are obtained. Although generally a primary amine will be used in carrying out the reaction, secondary N-haloamines may be employed. The aliphatic-amines includes the saturated, unsaturated and unsubstituted aliphatic amines and also substituted aliphatic amines, such as, for example, benzylamine, furylamine, etc. They also include the heterocyclic amines such as, for example, piperidine and morpholine. Thus, the amines which may be used include, for example, N-chloromethylamine, N-chloroethylamine, N-chloropropylamine, the N-chlorobutylamines, the N-chloroamylamines (including N-chlorocyclopentylamine), the N-chlorohexylamines (including N-chlorocyclohexylamine), the N-chlorooctylamines, N-chloro-diethylamine, N-chlorodipropylamine, the N-chloro-dibutylamines, the N-chloro-diamylamines, the N-chloro-dihexylamines, the N-chlorodiheptylamines, the N-chlorodioctylamines, N-chlorodicyclohexylamine, N-chloroallylamine, N-chloromethallylamine, N-chlorocrotonylamine, N-chlorofurfurylamine, N-chlorotetrahydrofurfurylamine, N-chlorobenzylamine, N - bromomethylamine, N - iodomethylamine, N-chloropiperidine, N-chloromorpholine, etc. Thus, the invention includes the use of the chloro-, bromo-, and iodo-aliphatic-type amines, whether saturated or unsaturated, whether cyclic or noncyclic, and whether substituted or unsubstituted. Ordinarily, the amines containing up to, for example, eight carbon atoms can be used in aqueous suspensions, but for longer-chain compounds such as N-chlorohexadecylamine, N-chlorooctadecylamine, etc., the solubility of the unchlorinated amines in the aqueous phase of the suspension is so low that some other solvent will be required in the continuous phase to give satisfactory results.

Ordinarily, the sodium salt of alpha-dithiofuroic acid will be used in carrying out the reaction, particularly if it is carried out in a suspension in which the continuous phase is water. The potassium salts may be used equally well. Any alkali metal (including ammonium) salt will be satisfactory and an alkaline earth metal salt such as calcium, etc. may be employed where sufficiently soluble in the continuous phase.

The following illustrates the preparation of one of the compounds to which this reaction relates:

*N-cyclohexylthiofuramide.*—A suspension of N-monochlorocyclohexylamine was prepared at $-10°$ by adding 0.23 mole of sodium hypochlorite (86.8 ml. of a 2.65 molar solution) to 0.25 mole of cyclohexylamine with stirring. To this suspension was added, also with stirring, a solution of 28.8 g. (0.2 mole) of dithiofuroic acid in 100 ml. of ten per cent sodium hydroxide solution. The solid precipitate was filtered off, washed with water and dried. The material weighed 43 g., a quantitative yield. After several recrystallizations from petroleum ether the material melted at 81–82° C.

Calc'd for $C_{11}H_{15}OSN$: N, 6.70; S, 15.3. Found: N, 6.88; S, 15.3.

What I claim is:

1. N-substituted thio-2-furamides having the formula

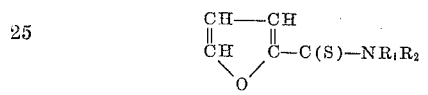

in which $R_1$ and $R_2$ are each from the class consisting of hydrogen, alkyl and cycloalkyl groups of not more than eighteen carbon atoms, allyl, alkyl-substituted allyl, crotonyl, furfuryl, tetrahydrofurfuryl, piperidyl and morpholyl, and both $R_1$ and $R_2$ are not hydrogen.

2. N-cycloalkyl-thio-2-furamides having the formula

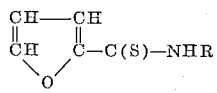

in which R is a cycloalkyl group.

3. N-dialkyl thio-2-furamide having the formula

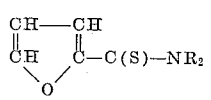

in which each R is cycloalkyl.

4. N-alkyl thio-2-furamide having the formula

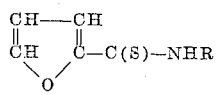

in which R is an alkyl group of not more than eighteen carbon atoms.

5. N-dialkyl thio-2-furamide having the formula

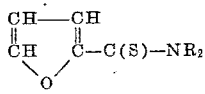

in which each R is an alkyl group of not more than eighteen carbon atoms.

6. N-cyclohexylthio-2-furamide having the formula

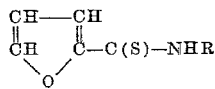

in which R is $C_6H_{11}$.

7. N-dicyclohexylthio-2-furamide having the formula

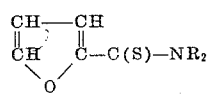

in which each R is $C_6H_{11}$.

8. N-cyclopentylthio-2-furamide having the formula

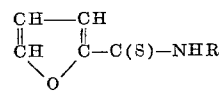

in which R is $C_5H_9$.

GLEN ALLIGER.

REFERENCES CITED

The following references are of record in the file of this patent:

UNITED STATES PATENTS

| Number | Name | Date |
|---|---|---|
| 2,223,130 | Prutton | Nov. 26, 1940 |

OTHER REFERENCES

Gillman et al.: Chemical Reviews, August, December 1932, p. 325.

Bowen et al.: J. Am. Chem. Soc., 62, pp. 3522–3523 (1940).

Lowy et al.: Introduction to Organic Chemistry, 5th ed., p. 187, John Wiley & Sons Inc., New York, January 1940.